United States Patent
Nadathur et al.

(10) Patent No.: US 8,631,415 B1
(45) Date of Patent: Jan. 14, 2014

(54) ADJUSTMENT OF THREADS FOR EXECUTION BASED ON OVER-UTILIZATION OF A DOMAIN IN A MULTI-PROCESSOR SYSTEM BY SUB-DIVIDING PARALLIZABLE GROUP OF THREADS TO SUB-DOMAINS

(75) Inventors: Gokul Nadathur, Fremont, CA (US); Manpreet Singh, Santa Clara, CA (US); Grace Ho, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 609 days.

(21) Appl. No.: 12/547,194

(22) Filed: Aug. 25, 2009

(51) Int. Cl.
*G06F 9/46* (2006.01)
*G06F 9/44* (2006.01)
*G06F 15/76* (2006.01)

(52) U.S. Cl.
USPC .......... 718/105; 718/104; 718/102; 717/127; 712/10; 712/11; 712/13

(58) Field of Classification Search
None
See application file for complete search history.

(56) References Cited

U.S. PATENT DOCUMENTS

| | | | | |
|---|---|---|---|---|
| 6,345,287 | B1* | 2/2002 | Fong et al. | 718/102 |
| 6,658,449 | B1* | 12/2003 | Brenner et al. | 718/105 |
| 7,290,259 | B2* | 10/2007 | Tanaka et al. | 718/104 |
| 7,290,260 | B2* | 10/2007 | Miller | 718/104 |
| 7,694,302 | B1* | 4/2010 | Rajan et al. | 718/104 |
| 7,748,005 | B2* | 6/2010 | Romero et al. | 718/104 |
| 7,996,346 | B2* | 8/2011 | Bell et al. | 718/102 |
| 8,312,464 | B2* | 11/2012 | Arimilli et al. | 718/105 |
| 2005/0172293 | A1* | 8/2005 | Petruncola et al. | 718/105 |

* cited by examiner

*Primary Examiner* — Meng An
*Assistant Examiner* — Bing Zhao
(74) *Attorney, Agent, or Firm* — Mahamedi Paradice Kreisman LLP

(57) ABSTRACT

Embodiments provide various techniques for dynamic adjustment of a number of threads for execution in any domain based on domain utilizations. In a multiprocessor system, the utilization for each domain is monitored. If a utilization of any of these domains changes, then the number of threads for each of the domains determined for execution may also be adjusted to adapt to the change.

14 Claims, 11 Drawing Sheets

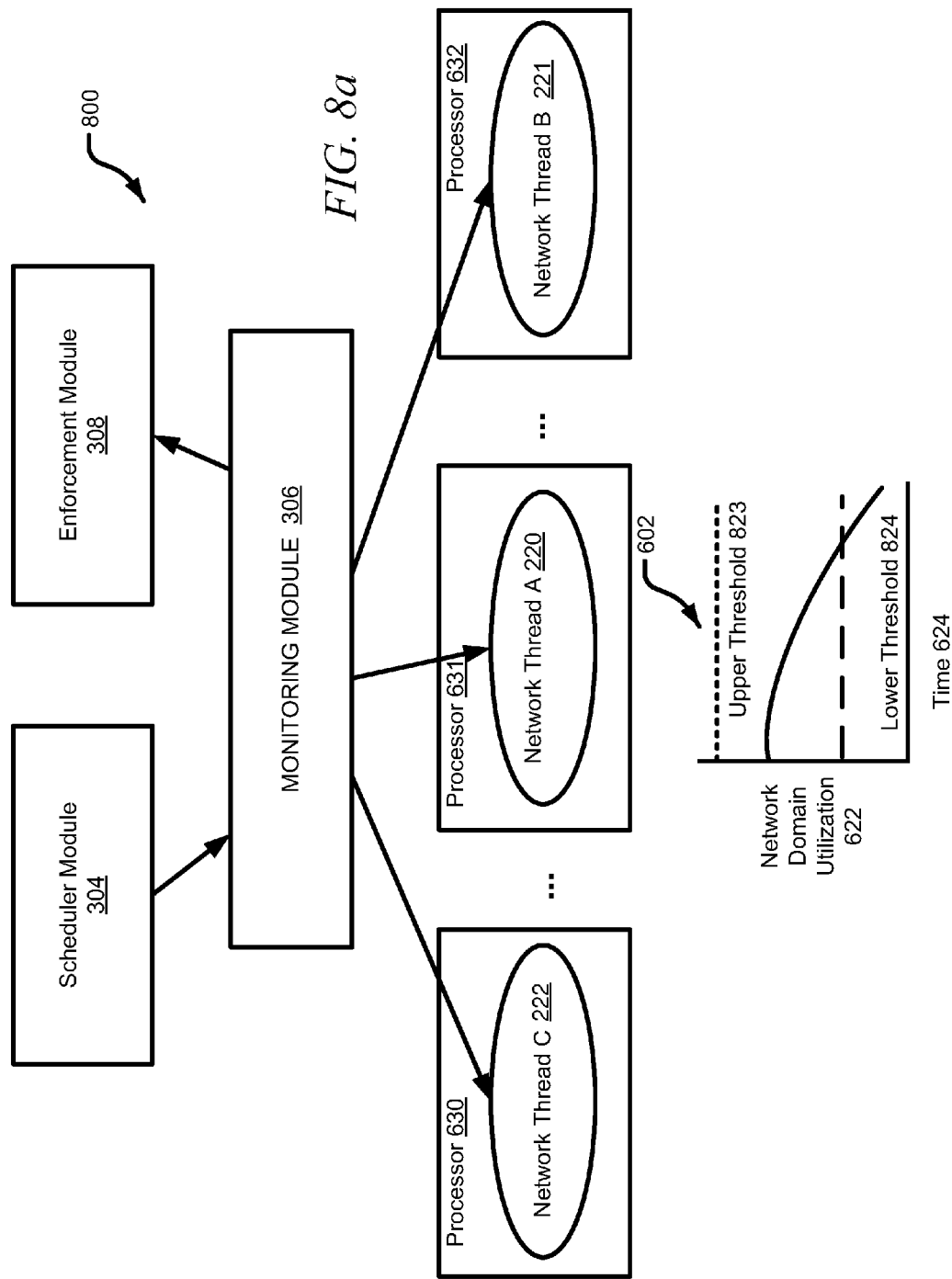

US 8,631,415 B1

ADJUSTMENT OF THREADS FOR EXECUTION BASED ON OVER-UTILIZATION OF A DOMAIN IN A MULTI-PROCESSOR SYSTEM BY SUB-DIVIDING PARALLIZABLE GROUP OF THREADS TO SUB-DOMAINS

FIELD

The present disclosure relates generally to multiprocessor execution. In an example embodiment, the disclosure relates to the adjustment of threads for execution based on domain utilization in a multiprocessor system.

BACKGROUND

The possibilities for parallel computing have greatly increased with the availability of multiprocessor systems. A multiprocessor system increases processing throughput by executing tasks or processes on two or more processors. Depending on the multiprocessor system design, these tasks may run on several or several hundred processors concurrently.

Managing concurrent execution on multiprocessor systems involves safeguarding data from modification by multiple processes. Indeterminate results, deadlocks, and data corruption may result if multiple tasks modify or access the same dataset. Accordingly, concurrent execution conditions on multiprocessor systems are managed to assure the proper access of data.

Conventional solutions resolve concurrent execution conditions using different types of locks or dividing processes into multiple domains. For example, fine-grained locking manages concurrent execution on multiple processors by dividing a task into many smaller pieces of code. Placing locks around these small pieces of code keeps them from being accessed or modified by other tasks. On the other hand, coarse-grained symmetric multiprocessor (CSMP) operates differently from the fine-grained locking approach. Instead of using locks, CSMP divides tasks (e.g., threads) along functional barriers into domains of tasks having similar functionality. The functional barriers represent a logical separation of tasks into different domains where these tasks can be run in parallel on different processors without conflict, with minimal sharing of data, and with minimal use of locks.

In CSMP, the number of threads in any domain is fixed. That is, the number of threads is constant for each particular domain. As a result, a fixed number of processors is allocated to execute threads associated with each domain. The hard coding of a fixed number of threads for each domain may create bottlenecks for the execution of threads associated with particular domains during heavy workloads. Alternatively, the hard coding may also create conditions where the processors become underutilized, thereby resulting in non-optimal use of the processors.

SUMMARY

Example embodiments provide various techniques for dynamic adjustment of a number of threads for execution in any domain based on domain utilization. Generally, a utilization of a particular domain refers to the throughput of one or more processors devoted to execute threads associated with that domain. Such a utilization, for example, depends on workloads presented to a storage server by a set of network attached clients. In a multiprocessor system, the utilization for each domain is monitored. If the utilization of any of these domains changes, then the number of threads associated with one or more domains determined for execution may also be adjusted to adapt to the change. In an example, a multiprocessor system that predominantly performs a certain functionality or workload during business hours can switch to performing a different functionality after business hours. With embodiments of the present invention, the multiprocessor system can dynamically adjust the number of threads for execution at different times (e.g., during or after business hours) to optimize performance for these different functionalities.

In one technique, particular functionalities that bottleneck system performance are identified and the number of threads associated with domains that implement these particular functionalities may be increased to relieve the system bottleneck. Here, the utilizations of multiple domains are monitored in reference to a threshold. This threshold essentially defines a point where a bottleneck condition can potentially occur. If one of these utilizations is identified to exceed the threshold, then a number of threads for execution is adjusted in order to increase a number of processors allocated to the domain where its utilization exceeds the threshold. As a result, the execution of threads associated with this domain is distributed to more processors, thereby reducing the bottleneck. In another technique, the number of threads associated with one or more domains can also be adjusted to reduce the number of processors allocated to a particular domain in order to, for example, better optimize thread execution.

BRIEF DESCRIPTION OF DRAWINGS

The present disclosure is illustrated by way of example and not limitation in the figures of the accompanying drawings, in which like references indicate similar elements and in which:

FIGS. 8a and 8b depict block diagrams and graphs of a multiprocessor system illustrating an example of reducing a number of processors allocated to a particular domain.

DESCRIPTION OF EXAMPLE EMBODIMENTS

The description that follows includes illustrative systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

Figure 1:
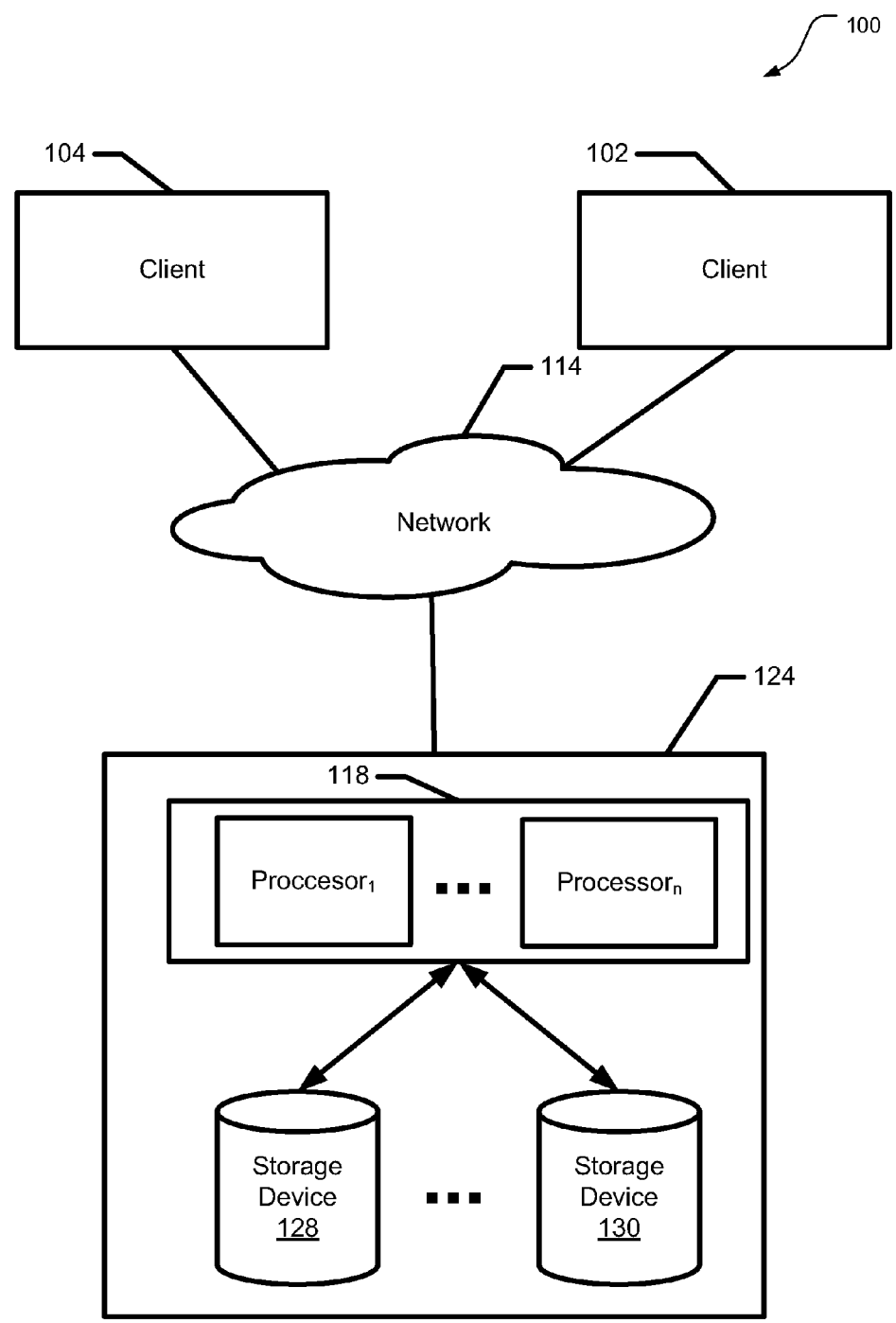
FIG. 1 depicts a block diagram of an example of a multiprocessor system, in accordance with some embodiments of the present invention.

A multiprocessor system supports multiple processors and has the capability to allocate tasks between the processors. Depending on the multiprocessor system design, these tasks may run on several or several hundred processors concurrently. FIG. 1 depicts a block diagram of an example of a multiprocessor system 100, in accordance with some embodiments of the present invention. The multiprocessor system 100 includes clients 102 and 104 and storage server 124. The clients 102 and 104 may be computers or other processing systems capable of accessing the storage server 124 either directly or indirectly over a network 114. The clients 102 and 104 may access the storage server 124 over the network 114 using wireless or wired connections supporting one or more point-to-point links, shared local area networks (LAN), wide area networks (WAN), or other access technologies. These clients 102 and 104 may be accessing data, applications, raw storage, or various combinations thereof stored on the storage server 124.

In this example, the multiprocessor system 100 is a type of storage system that provides storage services to clients 102 and 104 using, for example, storage area network (SAN), network-attached storage (NAS), or other storage technologies processed on multiple processors 118. However, it should be appreciated that alternate embodiments of the multiprocessor system 100 may deliver other types of computer services on a multiprocessor platform. For example, the storage server 124 may include web server technologies that deliver web pages and web services to the clients 102 and 104 over the Internet. In other embodiments, the storage server 124 may include other general purpose applications that can deliver various functionalities or data to the clients 102 and 104.

The storage server 124 is configured to operate according to a client/server model of information delivery thereby allowing multiple clients 102 and 104 to access files or other data simultaneously. In this model, the client 102 or 104 may be a computer running an application, such as a file-system protocol. Each client 102 or 104 may request the services of the storage server 124 by issuing storage-system protocol messages. For example, the clients 102 and 105 can request to either read data from or write data to the storage server 124.

In the example of FIG. 1, the storage server 124 is a file-level server, such as a server used in a NAS environment, a block-level storage server used in a SAN environment, or other storage systems capable of providing both file-level and block-level service. For example, the storage server 124 may use a combination of software and hardware to provide storage services including the organization of information on storage devices 128 and 130, such as disks. The storage server 124 includes a file system to organize logically the information as a hierarchical or other structure of directories and files on the disks 128 and 130.

Although the storage server 124 is illustrated as a single unit in FIG. 1, it can also be implemented in a distributed architecture. For example, the storage server 124 can be implemented with multiple distributed storage servers (not shown). Additionally, the storage server 124 can also include a physically separate network module and disk module (not shown), which communicate with other storage servers over an external interconnect. The network module functions as a front-end of the storage server 124, exporting services to the clients 102 and 104. The disk module functions as the back-end, managing and implementing a parity declustered distribution of a Redundant Array of Independent Disks (RAID) organization on the underlying storage of the storage server 124.

In a multiprocessor system 100, the storage server 124 uses two or more processors, as represented by processors 118, which may also include multiple core processor designs. The processors 118 represent two or more computational units available in the storage server 124, may be a physical aggregation of multiple individual processors that each individually execute threads. Alternate implementations of processors 118 may be a single processor having multiple on-chip cores that may partition and share certain resources on the processor die such as the L1/L2 cache. Therefore, the term "processor," as used herein, could be applied to designs utilizing one core or multiple cores found on a single chip or die. Likewise, thread execution is used to describe the act of executing a set of related instructions on one or several processors. As used herein, a "thread" refers to a separate stream of execution that takes place simultaneously with and independently of other steams of execution. As an example, a thread can be a single sequence of instructions executed in parallel with other sequence of instructions, either by time slicing or multiprocessing. This allows a program to split itself into two or more simultaneously running tasks. Unlike processes, multiple threads can share state information of a single process, share memory, and other resources directly.

Figure 2:
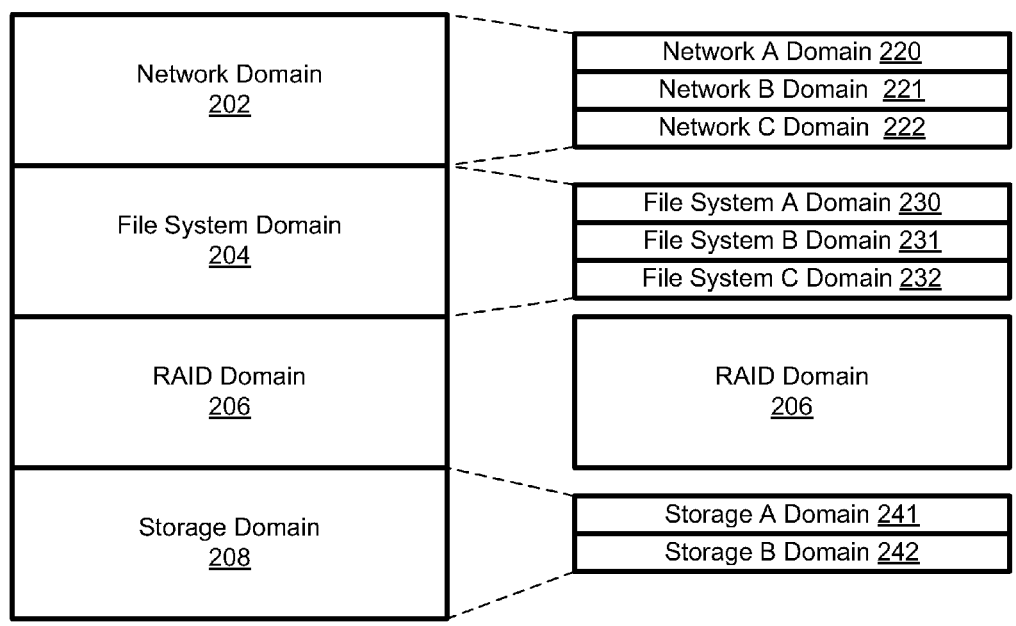
FIG. 2 depicts a block diagram illustrating examples of multiple domains, consistent with an embodiment.

In accordance with embodiments of the present invention, the storage system 124 can be configured to adjust a number of threads for execution by the processors 118 based on monitoring utilizations of multiple domains. FIG. 2 depicts a block diagram illustrating examples of multiple domains, consistent with an embodiment. It should be appreciated that threads to be executed are divided into a set of domains according to their functionality and tasks they perform. Therefore, a "domain," as used herein, refers to a grouping of threads based on a common functionality. Based upon this division, threads in the different domains may be scheduled to execute in parallel on multiple processors because, for example, threads in different domains generally have different functionalities and do not operate on the same data for the most part, thereby allowing them to execute in parallel without conflict. However, threads within each domain that share data and data structures can be limited to serialized execution on a single processor to avoid data contention or corruption.

Accordingly, threads are scheduled according to their assigned domain, which allow for multiprocessor parallel execution, in accordance with an embodiment of the present invention. For example, as depicted in FIG. 2, a storage server may implement multiprocessing using the following set of domains: a network domain 202, file system domain 204, a RAID domain 206, and a storage domain 208. As implied by their names, the network domain 202 includes threads related to performing network specific functions. The file system domain 204 includes threads related to file system functions. The RAID domain 206 includes threads dealing with implementing the RAID functions and different levels of RAID (e.g., RAID-0 through RAID-5). The storage domain 208 includes threads directly related to operating storage devices.

Given that threads within each domain 202, 204, 206, or 208 can be limited to serialized execution on a single processor, each domain 202, 204, 206, or 208 can be further divided into multiple domains. That is, each domain 202, 204, 206, or 208 can be further divided into multiple sub-domains or child domains, each of which is grouped based on functionalities of a single, parent domain. For example, as depicted in FIG. 2, the network domain 202 can be further divided into network A, B, and C domains 220, 221, and 222, respectively. Similarly, the file system domain 204 is further divided into file system A, B, and C domains 230, 231, and 232, respectively. The storage domain 208 can be further divided into storage A and B domains 241 and 242, respectively. With the subdivisions, multiple processors can be used to execute threads associated with a single, parent domain (e.g., the network domain 202, the file system domain 204, or the storage domain 208). In this example, up to three processors can be used to execute threads associated with the network domain 202. Similarly, up to two processors can be used to execute threads associated with the storage domain 208. However, the RAID domain 206 is not further divided into multiple domains and, as such, a single processor is used to execute threads associated with the RAID domain 206.

It should be appreciated that in an alternate embodiment of the present invention, each domain 202, 204, 206, or 208 may not be further divided into multiple sub-domains, but multiple processors can be configured to process multiple threads associated with a single domain. As an example, in reference to FIG. 2, the RAID domain 206 may not be divided into additional sub-domains, but processors in a particular type of a multiprocessor system can execute multiple threads concurrently.

Figure 3:
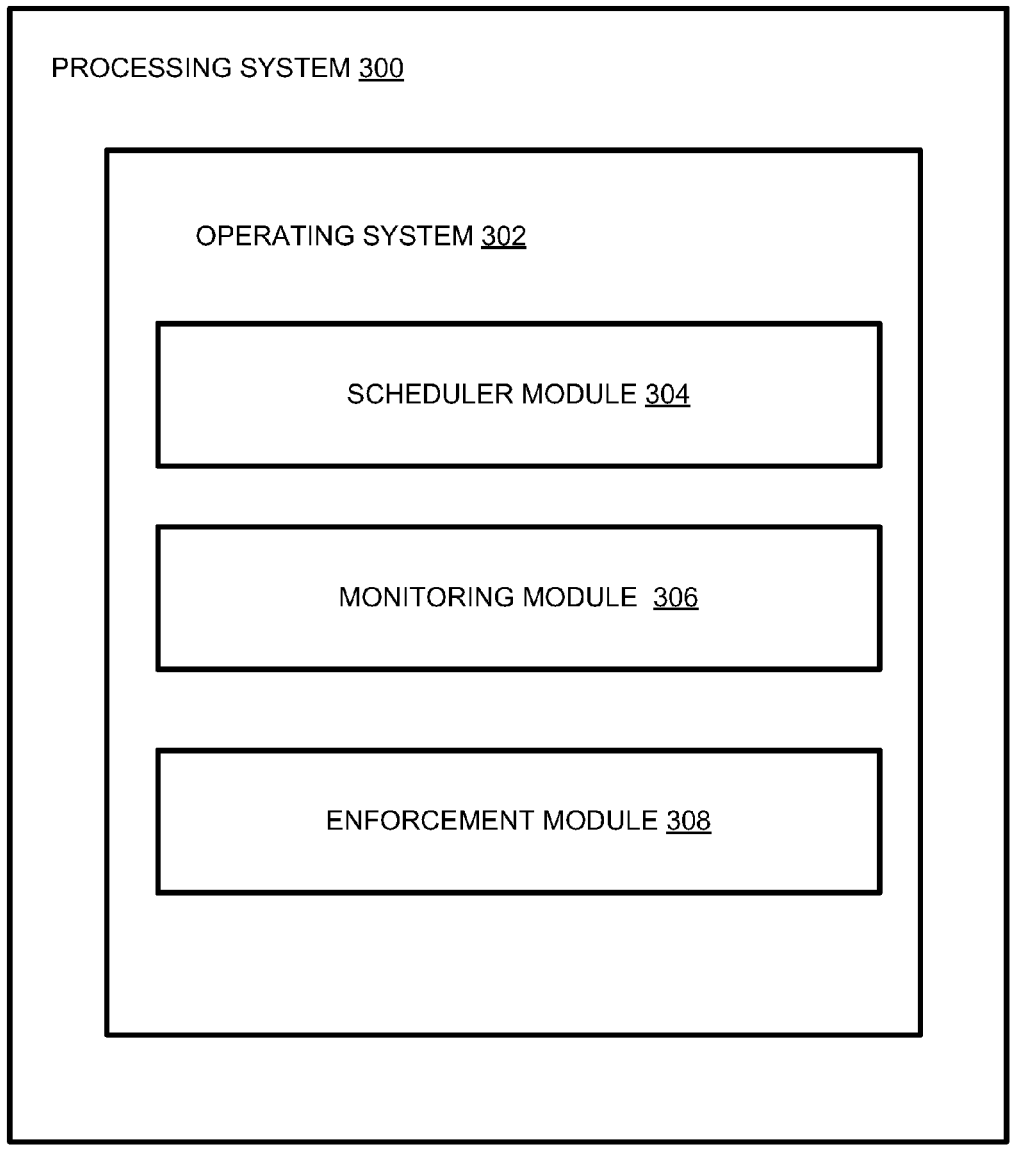
FIG. 3 depicts a block diagram of a processing system, in accordance with an embodiment, configured to dynamically adjust a number of threads for execution based on domain utilization.

FIG. 3 depicts a block diagram of a processing system 300, in accordance with an embodiment, configured to dynamically adjust a number of threads for execution based on domain utilization. It should be appreciated that the processing system 300 may be deployed in the form of, for example, a personal computer, a laptop computer, a server computer, a tablet personal computer, a personal digital assistant, or other computing devices. The processing system 300 may be included in a storage environment. For example, the processing system 300 may form a part of the storage server 124 depicted in FIG. 1. In various embodiments, the processing system 300 may be used to implement computer programs, logic, applications, methods, processes, or software to adjust a number of threads for execution, as described in more detail below.

In the example depicted in FIG. 3, the processing system 300 executes an operating system 302 that manages the other software processes and/or services executing on the processing system 300. An example of the operating system 302 is computer-executable code operable on a storage system that manages data access and client access requests, and may implement file system semantics. The software processes and/or other services that may be managed by the operating system 302 include a scheduler module 304, a monitoring module 306, and an enforcement module 308.

The scheduler module 304 is configured to categorize threads into each domain as necessary to fulfill a request. For example, the scheduler module 304 has information useful in organizing threads and the functions they perform into one or more predetermined domain categories. The separation of threads into the proper domains enables the scheduler module 304 to facilitate safe execution of these threads in a multiprocessor environment without, for example, locks or other additional exclusionary mechanisms used in symmetric multiprocessing (e.g., with use of a CSMP). The scheduler module 304 can calculate the utilization of a particular domain at a specific time or within a time period. As used herein, a "utilization" of a particular domain refers to a throughput of one or more processors executing threads associated with that particular domain. As an example, a utilization of a domain can be calculated based on the cumulative time that one or more processors devote to the execution of threads associated with that domain within a particular time period. The utilization may, for example, be in the form of a ratio of an execution time for a thread to the particular time period (e.g., ratio=execution time/time period). As explained in more detail below, in one embodiment, the utilization may be calculated based on a normalization of a number of utilizations. The utilization of a domain may also be referred to as "domain utilization" and therefore, the terms "utilization" and "domain utilization" may be used interchangeably.

The monitoring module 306 can be configured to monitor the utilization of each domain. For example, as explained in more detail below, the monitoring module 306 can monitor the domain utilizations based on information received from the scheduler module 304. In one embodiment, the monitoring module 306 can monitor the utilizations received from the scheduler module 304. In another embodiment, the monitoring module 306 can calculate and monitor different domain utilizations based on utilizations received from the scheduler module 304, as described in more detail below.

In addition to monitoring the domain utilizations, the monitoring module 306 may also identify whether the domain utilization exceeds or falls below a certain threshold. A "threshold," as used herein, refers to a predefined value defining an upper or lower limit of a domain utilization. Upon identification that the domain utilization exceeds or falls below a certain threshold, the enforcement module 308 adjusts a number of threads associated with one or more domains for execution to either increase or reduce the number of processors allocated to the domains, as also explained in more detail below.

It should be appreciated that in other embodiments, the processing system 300 may include fewer, more, or different modules apart from those shown in FIG. 3. For example, in an embodiment, the enforcement module 308 may be integrated within the monitoring module 306, thereby forming a single integrated module that monitors domain utilizations and adjusts a number of threads for execution based on the domains utilizations.

Figure 4:
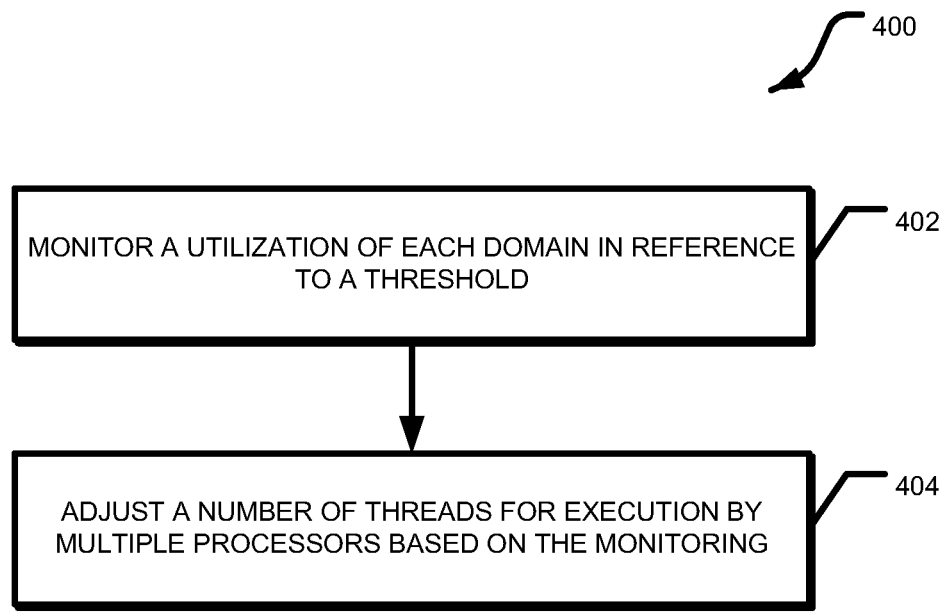
FIG. 4 depicts a flow diagram of a general overview of a method, in accordance with an embodiment, for determining a number of threads associated with various domains for execution by multiple processors.

FIG. 4 depicts a flow diagram of a general overview of a method 400, in accordance with an embodiment, for determining a number of threads associated with various domains for execution by multiple processors. In one embodiment, the method 400 may be implemented by the monitoring module 306 and the enforcement module 308, and employed in the processing system 300 of FIG. 3. In reference to FIG. 4, the utilization of each domain is monitored at 402 in reference to a threshold. In one embodiment, the domain utilizations can be monitored by transmitting a request for the domain utilizations to a scheduler module, which is configured to calculate the utilization of each domain. In response to the request, the domain utilizations are received from the scheduler module in response. Rather than transmitting upon receipt of a request, the scheduler module may also automatically provide or transmit the domain utilizations at predefined intervals, in accordance with another embodiment.

It should be appreciated that in one embodiment, the monitoring of the domain utilizations may be based on a normalization of the domain utilizations. A variety of different normalization techniques may be applied to the domain utilizations. For example, multiple utilizations from different times are received and these utilizations are associated with a single domain. The utilization associated with this domain that is being monitored is calculated based on an average of the received utilizations over the different times. As an illustrative example, a monitoring module receives a utilization associated with a domain at a particular time. Additionally, the monitoring module receives another utilization associated with the same domain, but from a different time. The monitoring module calculates the utilization based on an average of the two utilizations. The average utilization may be sampled over seconds or minutes. The average utilization may be monitored in order, for example, to avoid occasional spikes in the domain utilization, which can be false readings and may not accurately reflect the actual domain utilization.

A number of threads associated with one or more of the domains can be adjusted at 404 based on the monitoring of the domain utilizations. As explained in more detail below, the number of threads may be adjusted in order to increase or reduce the number of the processors allocated to a particular domain. The adjustments may be made by creating, destroying, activating, or deactivating one or more threads associated with one or more domains, and it should be appreciated that there are a variety of techniques for creating, destroying, activating, and deactivating the threads. It should be appreciated that there are a variety of techniques for creating, destroying, activating, and deactivating the threads. In one technique, for example, a thread may be created by creating the thread as an entity, assigning the thread to a particular domain, and binding the thread to a queue, which stores threads of that particular domain. Vice versa, a thread may be destroyed by unbinding the thread from a queue. The activation and the deactivation of a thread can be made by rebinding a queue to a different queue. For example, a thread associated with one domain can be deactivated by rebinding the thread to a different queue assigned to another domain. Similarly, a thread associated with one domain can be activated by rebinding the thread that is bound to a different queue to a queue assigned to this one domain.

The monitoring and adjustment of the threads function to determine an optimal use of the multiple processors in one or more processing systems, which are presented with a variety of different workloads at any instant of time. As the utilization associated with each domain changes resulting from a change in external workload, embodiments of the present invention effectively reevaluate each domain utilization and essentially redistribute the workload on a per domain basis such that, for example, processors allocated to a particular domain are not overloaded or underutilized.

Figure 5:
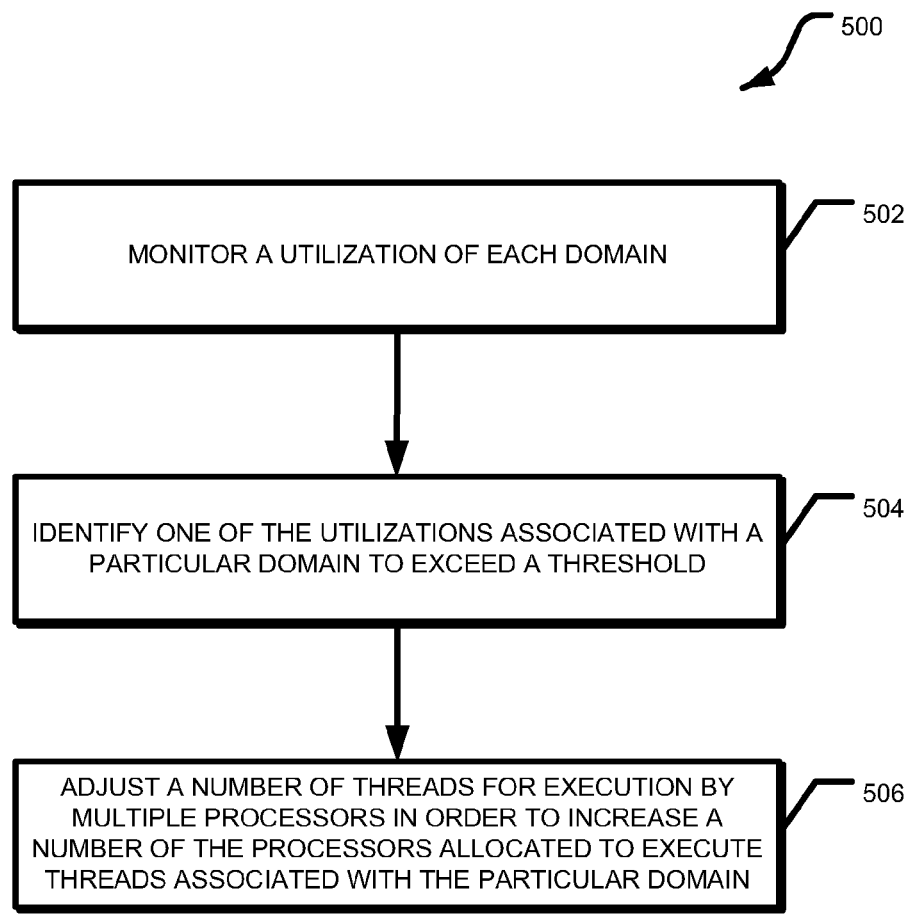
FIG. 5 depicts a flow diagram of a detailed method, in accordance with an embodiment, of increasing a number of processors allocated to a particular domain.

FIG. 5 depicts a flow diagram of a detailed method 500, in accordance with an embodiment, of increasing a number of processors allocated to a particular domain. In an embodiment, the method 500 may be implemented by the monitoring module 306 and the enforcement module 308, and employed in the processing system 300 of FIG. 3. In reference to FIG. 5, the utilization of each domain is monitored at 502, as described above. In the monitoring of the utilizations, at least one of the domain utilizations is identified at 504 to exceed a particular threshold. In an embodiment, the identification can be made by comparing the domain utilization with the threshold to identify whether the domain utilization is greater to, equal to, or less than the threshold value. It should be appreciated that in one embodiment, the domain utilization directly received from the scheduling module may be directly compared to the threshold. In another embodiment, the average of the domain utilizations is compared with the threshold.

Once a utilization associated with a particular domain is identified to exceed the threshold, a number of threads associated with the particular domain (and possibly other domains) is adjusted at 506 for execution by the processors. Here, the adjustment is made to increase a number of processors allocated to execute threads associated with the particular domain. In effect, by increasing the number of threads for execution, the number of processors allocated to the particular domain is increased.

Figure 6A:
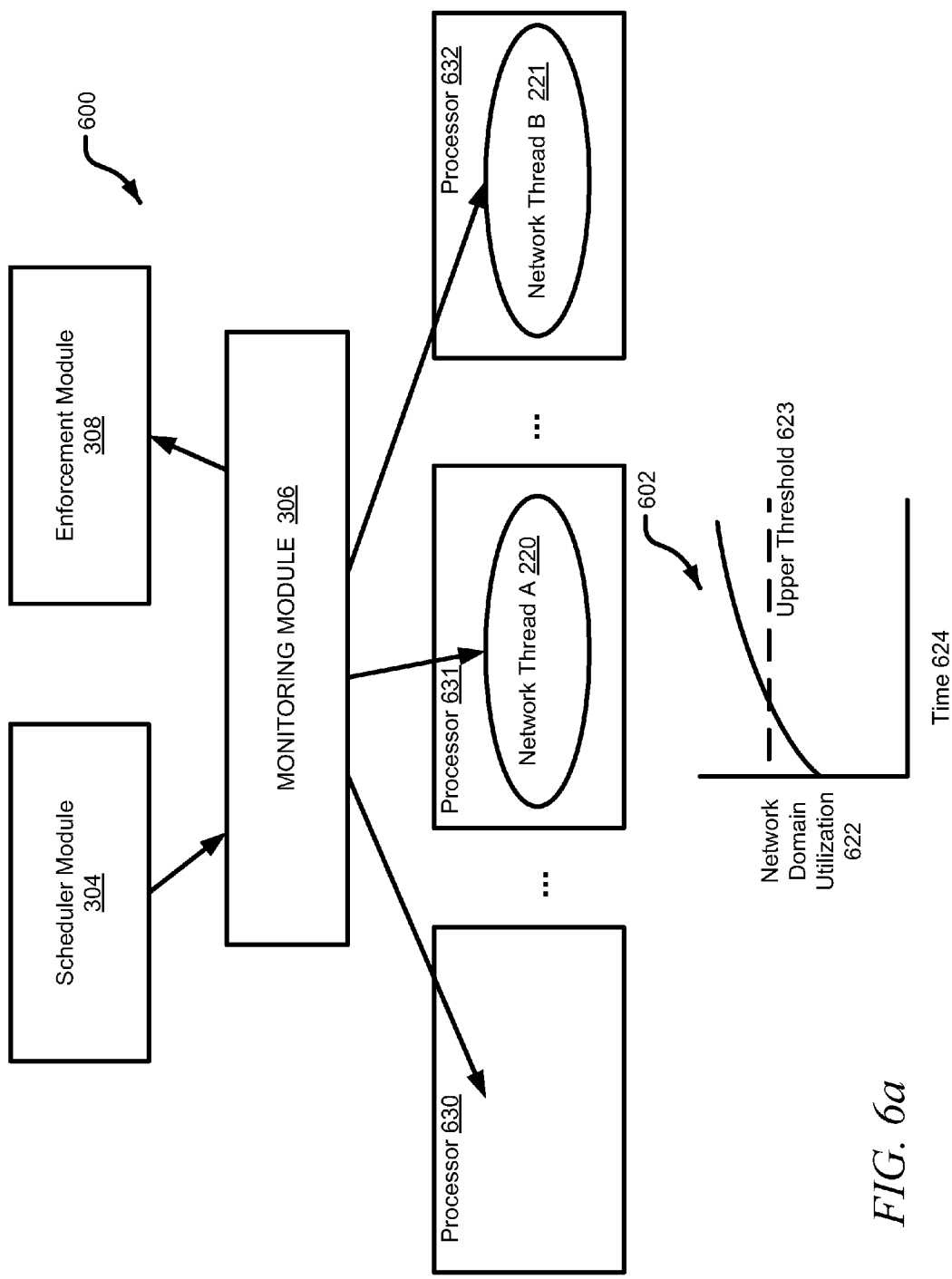
FIGS. 6a and 6b depict a block diagram and graphs of a multiprocessor system illustrating an example of increasing a number of processors allocated to a particular domain.
Figure 6B:
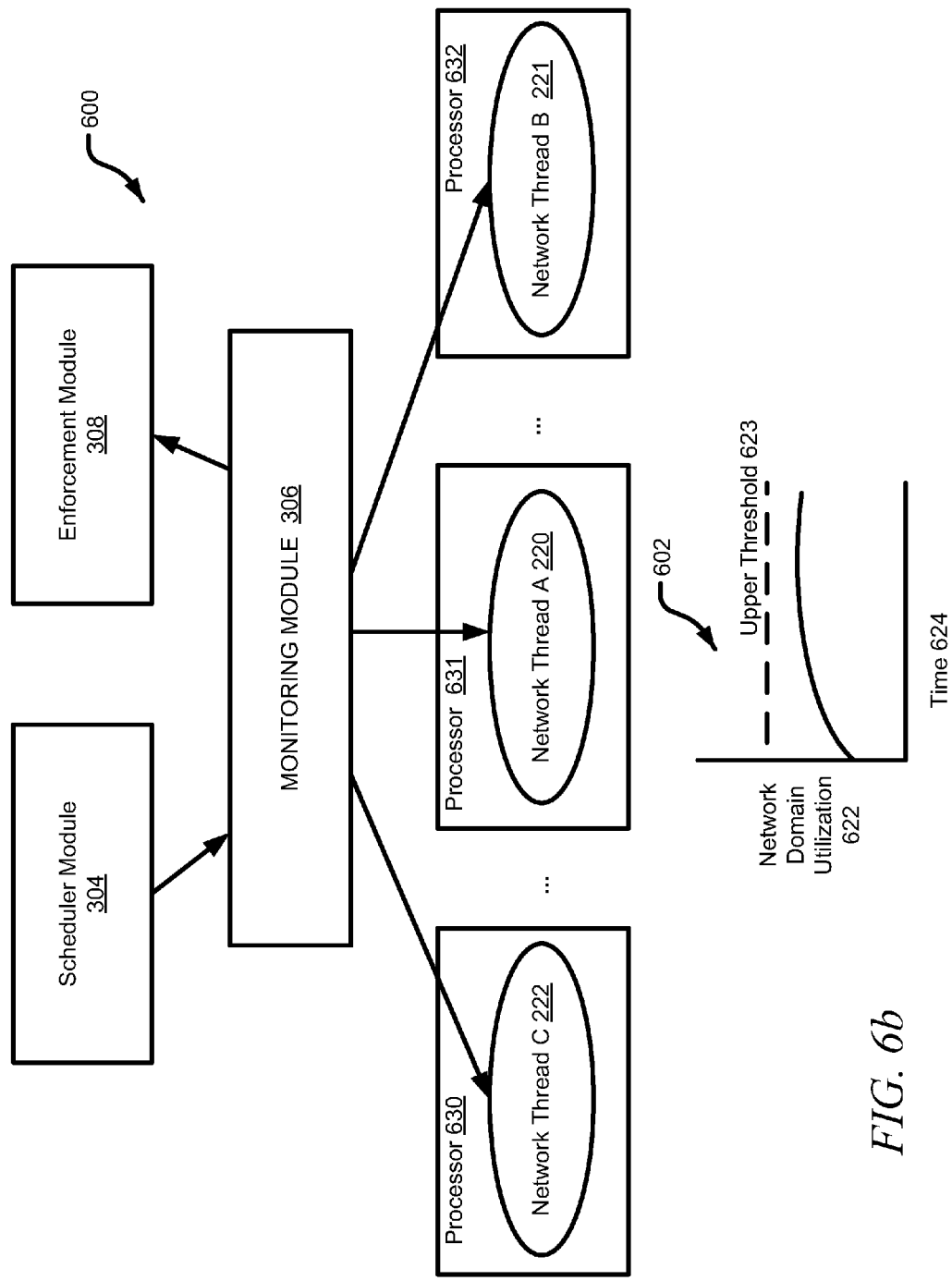

FIGS. 6a and 6b depict a block diagram of a multiprocessor system 600 and graph 602 illustrating an example of increasing a number of processors allocated to a particular domain. As depicted in FIG. 6a, the multiprocessor system 600 includes a scheduler module 304, an enforcement module 308, a monitoring module 306, and three processors 630, 631, and 632. At any given time, each processor 630, 631, or 632 is able to execute a single thread. In this example, processor 630 is not executing any thread while processors 631 and 632 are executing threads associated with a network domain, namely network thread A 220 and network thread B 221, respectively.

Additionally depicted in FIG. 6a is a graph 602 of the domain utilization distribution 622 for the network domain (or network domain utilization 622) over a period of time. In this graph 602, the horizontal axis defines the time 624 increasing from left to right while the vertical axis defines a utilization 622 of the network domain increasing from bottom to top.

In this example, the monitoring module 306 is monitoring the utilization 622 of the network domain by, for example, receiving multiple processor utilizations from the scheduler module 304 and calculating the network domain utilization 622 based on an average of the processor utilizations over a particular period of time (e.g., average of utilizations associated with processors 631 and 632). During the monitoring, the monitoring module 306 identifies the network domain utilization 622 to exceed an "upper" threshold 623. The upper threshold 623 defines a point where the network domain utilization 622 becomes excessive or overutilized. Exceeding the upper threshold 623 may signal that, for example, the multiprocessor system 600 is receiving an excessive amount of requests to process various functionalities of the network domain, more so than other domains. Accordingly, the number of threads associated with the network domain for execution is to be adjusted in order to increase a number of the processors 630-632 that are allocated to the network domain.

As depicted at FIG. 6b, the number of processors 631 and 632 can be increased by reassigning or reallocating processor 630 to execute a thread associated with the network domain, namely network thread C 222. For such a reassignment, the number of threads that are associated with the network domain for execution is adjusted by creating, destroying, activating, and/or deactivating various threads. In this example, upon receipt of a notification from the monitoring module 306 that the number of threads associated with the network domain needs to be increased, the enforcement module 308 may activate network thread C 222 associated with the same network domain for execution by the processor 630. As a result, as depicted, the number of processors 630-632 allocated to the network domain is increased from two processors 631 and 632, to three processors 630, 631, and 632. With an additional processor 630 allocated to the network domain, the plot 602 shows that the network domain utilization 622 is reduced to fall below the upper threshold 623, thereby may result in, for example, faster processing of functionalities associated with the network domain.

Figure 7:
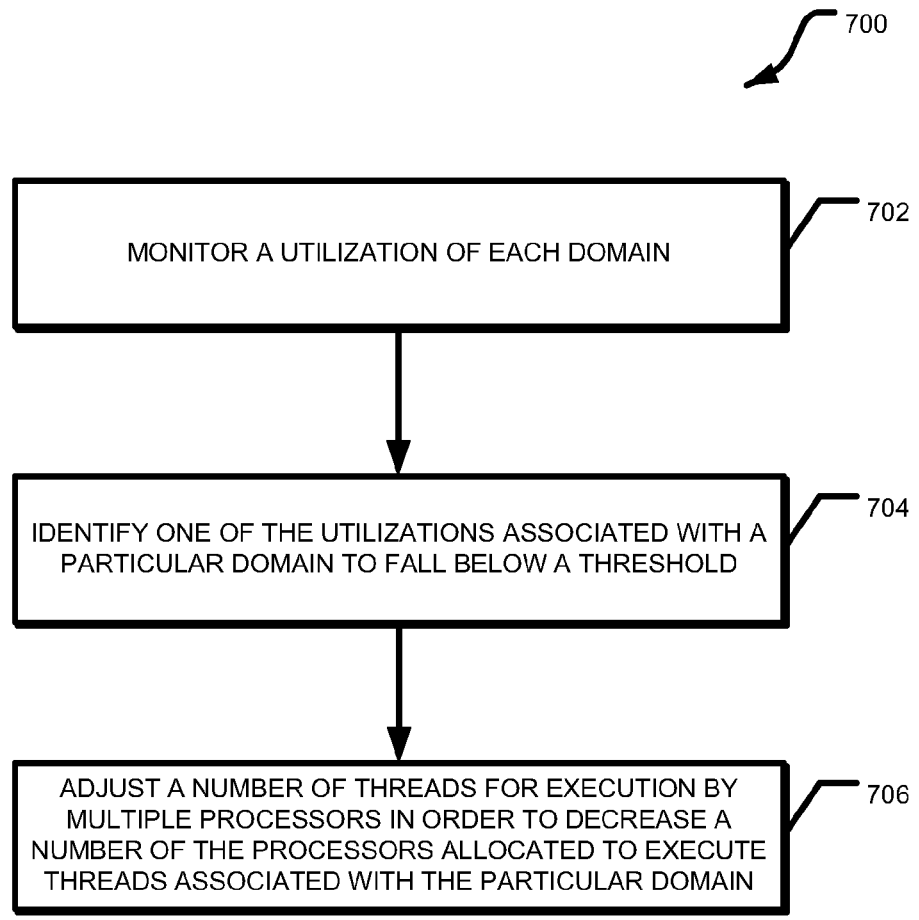
FIG. 7 depicts a flow diagram of a detailed method, in accordance with an alternate embodiment, of reducing a number of processors allocated to a particular domain.

FIG. 7 depicts a flow diagram of a detailed method 700, in accordance with an alternate embodiment, of reducing a number of processors allocated to a particular domain. In one embodiment, the method 700 may be implemented by the monitoring module 306 and the enforcement module 308, and employed in the processing system 300 of FIG. 3. In reference to FIG. 7, the utilization of each domain is monitored at 702.

In the monitoring of the utilizations, at least one of the domain utilizations is identified at 704 to fall below a particular threshold, and as explained above, the identification may be based on the domain utilizations directly received from the scheduling module or based on the average of the domain utilizations.

Once a utilization associated with a particular domain is identified to fall below a threshold, a number of threads associated with the same domain is adjusted at 706 for execution by the processors. Here, the adjustment is made to reduce a number of threads associated with the particular domain. In effect, by reducing the number of threads for execution, the number of processors allocated to the particular domain is reduced. It should be appreciated that executing threads associated with a single domain on fewer processors may, in certain circumstances, increase performance because the overhead in sharing among fewer processors is reduced and cache affinity is improved. There is an increased likelihood that the data already stored in a cache will be reused by another processor when fewer processors are running and share a common cache.

Figure 8B:
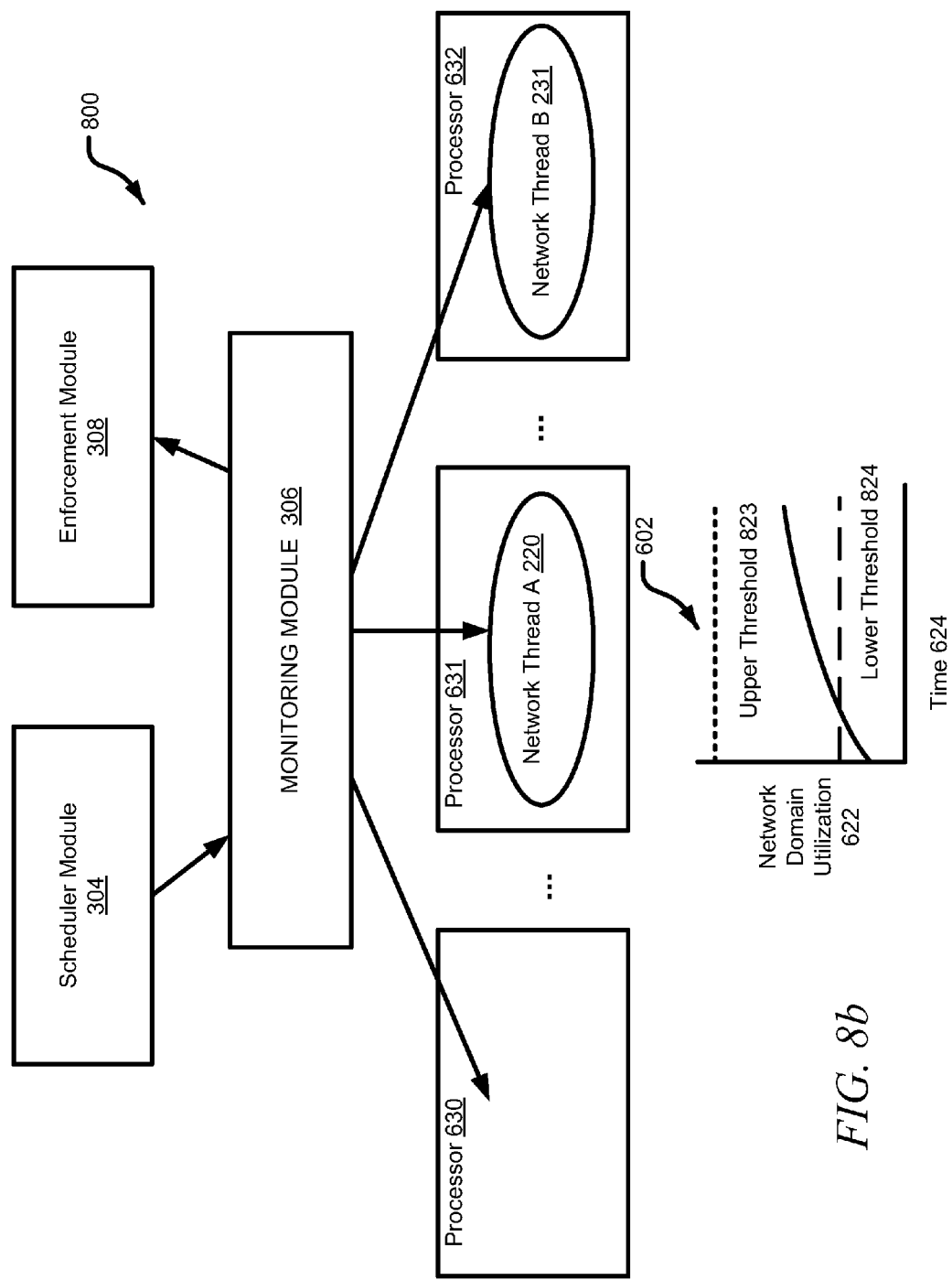

FIGS. 8a and 8b depict block diagrams of a multiprocessor system 800 and graph 602 illustrating an example of reducing a number of processors allocated to a particular domain. As depicted in FIG. 8a, the multiprocessor system 800 includes a scheduler module 304, an enforcement module 308, a monitoring module 306, and three processors 630-632. At any given time, each processor 630, 631, or 632 is able to execute a single thread. In this example, the processors 630, 631, and 632 are executing threads associated with the network domain, namely network thread C 222, network thread A 220, and network thread B 221, respectively.

Additionally depicted in FIG. 8a is a graph 602 of an utilization distribution for the network domain over a period of time. Similar to the previous graph, in graph 602, the horizontal axis defines the time 624 increasing from left to right while the vertical axis defines the utilization 622 of the network domain (or network domain utilization 622) increasing from bottom to top.

In this example, the monitoring module 306 is monitoring the network domain utilization 622. In this alternate embodiment, the monitoring module 306 monitors the network domain utilization 622 in reference to two thresholds, namely an "upper" threshold 823 and a "lower" threshold 824. In contrast to the upper threshold 823, the lower threshold 824 defines another point where the network domain utilization 622 becomes underutilized.

During the monitoring, the monitoring module 306 identifies the utilization 622 associated with the network domain to fall below the lower threshold 824. In this condition, the number of threads associated with the network domain can be reduced in order to reduce the number of processors 630-632 allocated to execute threads associated with the network domain (e.g., network thread C 222, network thread A 220, and network thread B 221). On the other hand, if the network domain utilization 622 exceeds the upper threshold 823, then, as explained above, the number of threads associated with the network domain can be increased to increase the number of processors 630-632, including other processors, allocated to the network domain.

In reference to FIG. 8a, given that the network domain utilization 622 falls below the lower threshold 824, the monitoring module 306 transmits a notification to the enforcement module 308 that the network domain utilization 622 associated with the network domain fell below the lower threshold 824. As a result, as depicted in FIG. 8b, the enforcement module 308 adjusts a number of threads associated with the network domain to reduce the number of processors 630-632 allocated to execute such threads. In this example, the enforcement module 308 destroys threads associated with the network domain, namely the network thread C 222, that are scheduled for execution on processor 630. As a result, only processors 631 and 632 are executing threads associated with the network domain, namely network thread A 220 and network thread B 221, respectively. As a result of the adjustment, graph 602 now shows the network domain utilization 622 now exceeds the lower threshold 824, but is still below the upper threshold 823, thereby resulting, for example, in more optimal distribution of the network domain utilization 622.

Figure 9:
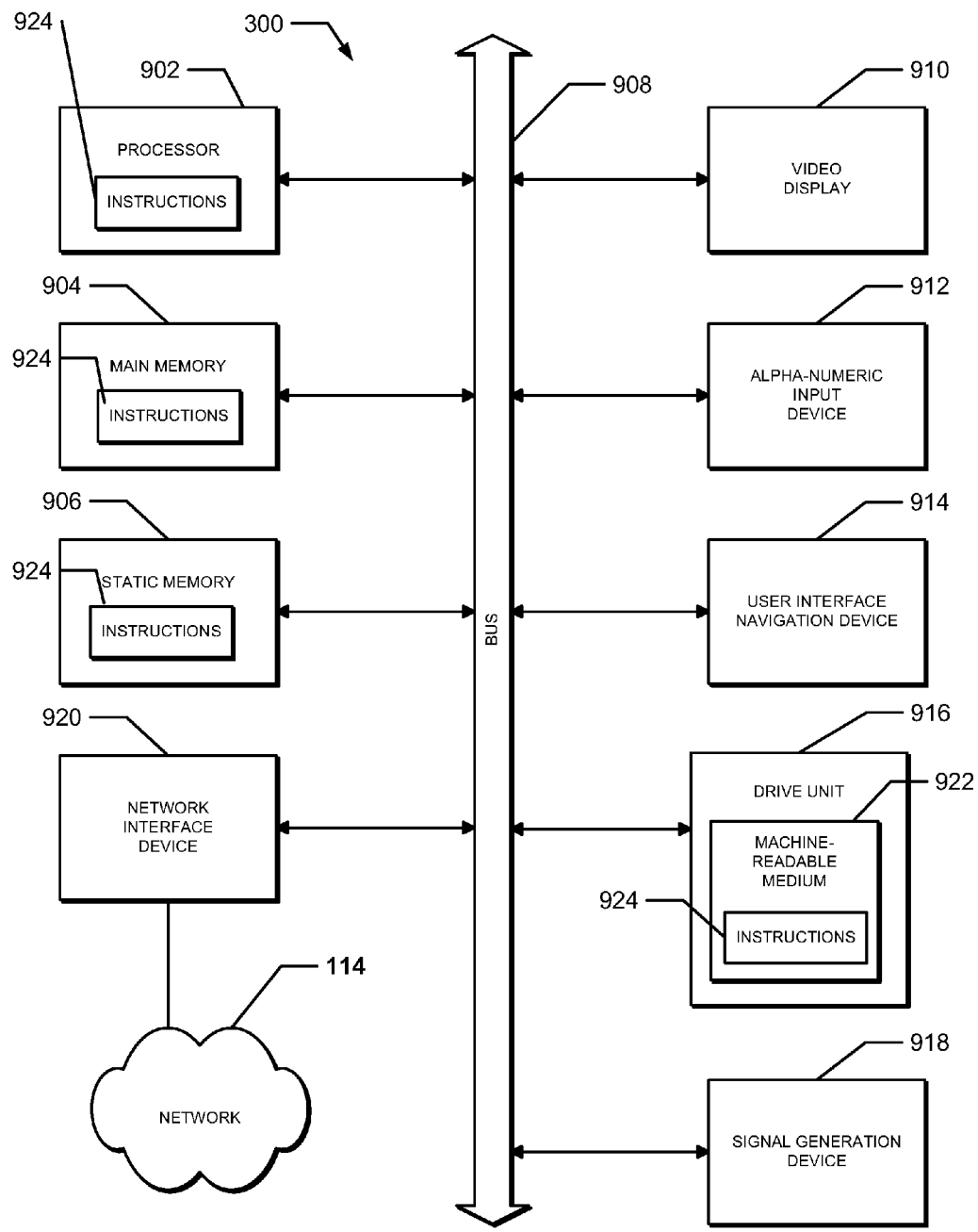
FIG. 9 depicts a block diagram of a machine in the example form of a processing system within which may be executed a set of instructions for causing the machine to perform any one or more of the methodologies discussed herein.

FIG. 9 depicts a block diagram of a machine in the example form of a processing system 300 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Embodiments may also, for example, be deployed by Software-as-a-Service (SaaS), Application Service Provider (ASP), or utility computing providers, in addition to being sold or licensed via traditional channels.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 300 includes a processor 902 (e.g., a central processing unit (CPU), a graphics processing unit (GPU) or both), a main memory 904 (e.g., random access memory (a type of volatile memory)), and static memory 906 (e.g., static random access memory (a type of volatile memory)), which communicate with each other via bus 908. The processing system 300 may further include video display unit 910 (e.g., a plasma display, a liquid crystal display (LCD) or a cathode ray tube (CRT)). The processing system 300 also includes an alphanumeric input device 912 (e.g., a keyboard), a user interface (UI) navigation device 914 (e.g., a mouse), a disk drive unit 916, a signal generation device 918 (e.g., a speaker), and a network interface device 920.

The disk drive unit 916 (a type of non-volatile memory storage) includes a machine-readable medium 922 on which is stored one or more sets of data structures and instructions 924 (e.g., software) embodying or utilized by any one or more of the methodologies or functions described herein. The data structures and instructions 924 may also reside, completely or at least partially, within the main memory 904 and/or within the processor 902 during execution thereof by processing system 300, with the main memory 904 and processor 902 also constituting machine-readable, tangible media.

The data structures and instructions 924 may further be transmitted or received over a network 114 via network interface device 920 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the processing system 300) or one or more hardware modules of a computer system (e.g., a processor 902 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 902 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 902 configured using software, the general-purpose processor 902 may be configured as respective different hardware modules at different times. Software may accordingly configure a processor 902, for example, to constitute a particular hardware module at one instance of time and to constitute a different hardware module at a different instance of time.

Modules can provide information to, and receive information from, other hardware modules. For example, the described hardware modules may be regarded as being communicatively coupled. Where multiples of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 902 that are temporarily configured (e.g., by software) or permanently configured to perform the relevant operations. Whether temporarily or permanently configured, such processors 902 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 902 or processor-implemented modules. The performance of certain of the operations may be distributed among the one or more processors 902, not only residing within a single machine, but deployed across a number of machines. In some example embodiments, the processor or processors 902 may be located in a single location (e.g., within a home environment, an office environment or as a server farm), while in other embodiments the processors 902 may be distributed across a number of locations.

While the embodiment(s) is (are) described with reference to various implementations and exploitations, it will be understood that these embodiments are illustrative and that the scope of the embodiment(s) is not limited to them. In general, techniques for adjusting treads for execution based on domain utilization may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

The invention claimed is:

1. A method comprising:
dividing a plurality of threads into a first set of threads corresponding to a first domain and a second set of threads corresponding to a second domain, the first set of threads being identified as being capable of being executed in parallel without conflict with respect to the second set of threads based on a determination that the first set of threads operates on a first set of data items and the second set of threads operates on a second set of data items that is different from the first set of data items;
assigning a first processor of a plurality of processors to the first domain and a second processor of the plurality of processors to the second domain;
detecting that the first processor is overutilized by the first set of threads by (i) comparing a utilization associated with the first domain with a threshold utilization, and (ii) determining that the utilization associated with the first domain exceeds the threshold utilization; and
in response to detecting that the first processor is overutilized by the first set of threads, (i) dividing the first set of threads corresponding to the first domain into a third set of threads and a fourth set of threads, the third set of threads being identified as being capable of being executed in parallel without conflict with respect to the fourth set of threads based on a determination that the third set of threads operates on a third set of data items and the fourth set of threads operates on a fourth set of data items that is different from the third set of data items, and (ii) assigning the first processor to the third set of threads of the first domain and a third processor of the plurality of processors to the fourth set of threads of the first domain.

2. The method of claim 1, wherein the utilization associated with the first domain is determined by determining an average of a plurality of utilizations of the first domain at different instances in time.

3. The method of claim 1, wherein dividing the plurality of threads into the first set of threads corresponding to the first domain and the second set of threads corresponding to the second domain includes binding the first set of threads to a first queue and binding the second set of threads to a second queue, the first queue being assigned to the first domain and the second queue being assigned to the second domain.

4. The method of claim 1, wherein assigning the third processor of the plurality of processors to the fourth set of threads of the first domain includes reallocating the third processor of the plurality of processors from the second domain to the first domain based on a determination that the third processor is underutilized by the second set of threads.

5. The method of claim 4, wherein the determination that the third processor of the plurality of processors is underutilized is based on a determination than an average of a plurality of utilizations of the second domain at different instances in time falls below a second, lower threshold utilization.

6. A system comprising:
a plurality of processors;
wherein at least one of the plurality of processors implements a processor-implemented module to:
divide a plurality of threads into a first set of threads corresponding to a first domain and a second set of threads corresponding to a second domain, the first set of threads being identified as being capable of being executed in parallel without conflict with respect to the second set of threads based on a determination that the first set of threads operates on a first set of data items and the second set of threads operates on a second set of data items that is different from the first set of data items;
assign a first processor of the plurality of processors to the first domain and a second processor of the plurality of processors to the second domain;
detect that the first processor is overutilized by the first set of threads by (i) comparing a utilization associated with the first domain with a threshold utilization, and (ii) determining that the utilization associated with the first domain exceeds the threshold utilization; and
in response to detecting that the first processor is overutilized by the first set of threads, (i) divide the first set of threads corresponding to the first domain into a third set of threads and a fourth set of threads, the third set of threads being identified as being capable of being executed in parallel without conflict with respect to the fourth set of threads based on a determination that the third set of threads operates on a third set of data items and the fourth set of threads operates on a fourth set of data items that is different from the third set of data items, and (ii) assign the first processor to the third set of threads of the first domain and a third processor of the plurality of processors to the fourth set of threads of the first domain.

7. The system of claim 6, wherein the utilization associated with the first domain is determined by determining an average of a plurality of utilizations of the first domain at different instances in time.

8. The system of claim 6, wherein the processor-implemented module divides the plurality of threads into the first set of threads corresponding to the first domain and the second set of threads corresponding to the second domain by binding the first set of threads to a first queue and binding the second set of threads to a second queue, the first queue being assigned to the first domain and the second queue being assigned to the second domain.

9. The system of claim 6, wherein the processor-implemented module assigns the third processor of the plurality of processors to the fourth set of threads of the first domain by reallocating the third processor of the plurality of processors from the second domain to the first domain based on a determination that the third processor is underutilized by the second set of threads.

10. The system of claim 9, wherein the determination that the third processor of the plurality of processors is underutilized is based on a determination than an average of a plurality of utilizations of the second domain at different instances in time falls below a second, lower threshold utilization.

11. A non-transitory machine-readable storage medium embodying a set of instructions that, when executed by at least one processor, causes the processor to perform operations comprising:
dividing a plurality of threads into a first set of threads corresponding to a first domain and a second set of threads corresponding to a second domain, the first set of threads being identified as being capable of being executed in parallel without conflict with respect to the second set of threads based on a determination that the first set of threads operates on a first set of data items and the second set of threads operates on a second set of data items that is different from the first set of data items;
assigning a first processor of a plurality of processors to the first domain and a second processor of the plurality of processors to the second domain;
detecting that the first processor is overutilized by the first set of threads by (i) comparing a utilization associated with the first domain with a threshold utilization, and (ii) determining that the utilization associated with the first domain exceeds the threshold utilization; and
in response to detecting that the first processor is overutilized by the first set of threads, (i) dividing the first set of threads corresponding to the first domain into a third set of threads and a fourth set of threads, the third set of threads being identified as being capable of being executed in parallel without conflict with respect to the fourth set of threads based on a determination that the third set of threads operates on a third set of data items and the fourth set of threads operates on a fourth set of data items that is different from the third set of data items, and (ii) assigning the first processor to the third set of threads of the first domain and a third processor of the plurality of processors to the fourth set of threads of the first domain.

12. The non-transitory machine-readable storage medium of claim 11, wherein the utilization associated with the first domain is determined by determining an average of a plurality of utilizations of the first domain at different instances in time.

13. The non-transitory machine-readable storage medium of claim 11, wherein the instructions cause the processor to divide the plurality of threads into the first set of threads corresponding to the first domain and the second set of threads corresponding to the second domain by binding the first set of threads to a first queue and binding the second set of threads to a second queue, the first queue being assigned to the first domain and the second queue being assigned to the second domain.

14. The non-transitory machine-readable storage medium of claim 11, wherein the instructions cause the processor to assign the third processor of the plurality of processors to the fourth set of threads of the first domain by reallocating the third processor of the plurality of processors from the second domain to the first domain based on a determination that the third processor is underutilized by the second set of threads.

* * * * *